United States Patent
Song

[19]

[11] Patent Number: 6,144,416
[45] Date of Patent: *Nov. 7, 2000

[54] APPARATUS OF SHIELDING VLF ELECTRIC FIELD EMITTED FROM FRONT FACE OF CRT IN VIDEO APPLIANCE

[75] Inventor: Hee Young Song, Seoul, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/046,510

[22] Filed: Mar. 24, 1998

[30] Foreign Application Priority Data

Oct. 9, 1997 [KR] Rep. of Korea .................. 97-51769

[51] Int. Cl.$^7$ .................................................. H04N 5/65
[52] U.S. Cl. ..................................... 348/819; 315/370
[58] Field of Search .................................... 348/819, 806, 348/730, 173, 820; 315/370, 8, 364, 387, 85, 375, 12.1; 174/35 R; H04N 5/65

[56] References Cited

U.S. PATENT DOCUMENTS

| | | | |
|---|---|---|---|
| 3,569,621 | 3/1971 | Krug | 348/370 |
| 3,721,854 | 3/1973 | Sunstein | 315/375 |
| 4,992,624 | 2/1991 | Benson et al. | 174/35 R |
| 5,036,257 | 7/1991 | Norman et al. | 348/173 |
| 5,089,754 | 2/1992 | George | 348/173 |
| 5,107,179 | 4/1992 | Vidovich | 315/8 |
| 5,208,517 | 5/1993 | Beppu | 348/806 |
| 5,568,112 | 10/1996 | Cure | 315/8 |
| 5,689,157 | 11/1997 | Jitsukata et al. | 315/370 |
| 5,726,538 | 3/1998 | Jackson et al. | 315/370 |
| 5,786,668 | 7/1998 | Lim et al. | 315/85 |

FOREIGN PATENT DOCUMENTS

| | | |
|---|---|---|
| 0 500 349 | 8/1992 | European Pat. Off. . |
| 0 727 806 | 8/1996 | European Pat. Off. . |
| 2306872 | 5/1997 | United Kingdom . |
| WO93/10537 | 5/1993 | WIPO . |

*Primary Examiner*—Chris S. Kelley
*Assistant Examiner*—Gims Philippe
*Attorney, Agent, or Firm*—Jacobson, Price, Holman & Stern, PLLC

[57] ABSTRACT

An apparatus of shielding a very low frequency (VLF) electric field on the front face of a cathode ray tube (CRT) in a video appliance. The apparatus includes a signal detection section, connected to the flyback transformer, for detecting an anode voltage applied to the anode of the CRT; an inversion-amplifying section for inversion-amplifying the anode voltage detected by the signal detection section; a waveform-shaping section for waveform-shaping the negative polarity pulse signal induced from the induction coil; a signal synthesizing section for synthesizing the negative polarity pulse signal inputted from the waveform-shaping section with an output signal of the inversion amplifying section; an output amplifying section for amplifying the synthesized negative polarity pulse signal inputted from the signal synthesizing section; and an open-loop antenna, mounted on a predetermined portion of the CRT, for radiating the synthesized negative polarity pulse signal inputted from the output amplifying section. The VLF electric field generated from the CRT is offset by the electric field caused by the synthesized negative polarity pulse radiated through the open-loop antenna.

4 Claims, 3 Drawing Sheets

APPARATUS OF SHIELDING VLF ELECTRIC FIELD EMITTED FROM FRONT FACE OF CRT IN VIDEO APPLIANCE

BACKGROUND OF THE INVENTION

1. Field of the Invention

The present invention relates to an apparatus of shielding an electric field of a very low frequency (VLF) from the front face of a cathode ray tube (CRT) in a video appliance.

2. Description of the Prior Art

A video appliance such as a monitor using a CRT generally employs an electron gun for emitting electron beams to display images on a CRT screen. To properly position the electron beams on the screen, magnetic field generated by a deflection yoke installed on a neck portion of the CRT (not illustrated) is utilized. If an electric current flows to the deflection coil to generate such magnetic field, electric field is also generated from the deflection coil. Thus, a considerable amount of electromagnetic waves always is generated around the monitor. Accordingly, an apparatus for eliminating the electromagnetic waves has been provided in a conventional video appliance.

The circuit for eliminating electromagnetic waves in the conventional video appliance described above is illustrated in FIG. 1.

Referring to FIG. 1, the conventional circuit comprises a horizontal driving pulse generation section 70 for generating a horizontal driving pulse signal according to a horizontal synchronous signal inputted from a personal computer (PC) (not illustrated), a flyback transformer 72 for generating a high voltage according to the horizontal driving pulse signal of the horizontal driving pulse generation section 70 and supplying the high voltage to an anode of the CRT 71, an electromagnetic wave offset section 74 for waveform-shaping the negative polarity pulse signal induced in an induction coil 73 integrally wound with the flyback transformer 72 at a predetermined number of turns, and a lead wire 75 for offsetting the electromagnetic wave generated from the front face of the CRT 71.

The lead wire 75 is wound at least once along the external periphery of the CRT 71 in an open-loop state.

The horizontal driving pulse generating section 70 comprises a transistor Q for being switched on and off according to the horizontal synchronous signal inputted from the PC, and a deflection coil DY formed on the neck portion of the CRT 71 for deflecting the electron beams on the screen of the CRT 71. A capacitor C1 and a diode D1 are connected in parallel between the collector of the transistor Q and one end of the deflection coil DY, while a capacitor C2 is connected to the other end of the deflection coil DY. An anode of the CRT 71 is connected to the secondary winding of the flyback transformer 72.

The electromagnetic wave offset section 74 comprises dividing resistors R1, R2 connected to one end of the induction coil 73 for adjusting the level of the negative polarity pulse signal induced by the induction coil 73, a capacitor C3 and a resistor R3 which are connected in parallel to the other end of the resistor R1 for waveform-shaping the negative polarity pulse signal, and a capacitor C4 and a resistor R4 which are connected between the resistor R3 and the lead wire 76 for eliminating the spike-like noise of the negative polarity pulse signal.

The reference numeral $C_{HV}$ in the drawing denotes a capacitor.

The operation of the conventional circuit for eliminating the electromagnetic wave in a video appliance will now be explained.

If power from a power supply is applied to the primary winding of the flyback transformer 72, and a horizontal synchronous signal is inputted from the PC to the base of the transistor Q in the horizontal driving pulse generation section 70, the transistor Q drives the flyback transformer 72. In other words, if the transistor Q is turned on/off, the flyback transformer 72 induces and applies the high voltage to the anode of the CRT 71. The voltage at the primary winding of the flyback transformer 72 is also inputted to the deflection coil DY as the transistor Q is turned on. Accordingly, a deflection current flows through the deflection coil DY, and the electron beams emitted from the electron gun are deflected.

The negative polarity pulse voltage Va induced in the secondary winding of the flyback transformer 72 is level-adjusted by the dividing resistors R1, R2, as expressed by the following equation.

$$Va = \frac{R1}{R1+R2} * B^+ + \frac{R2}{R1+R2} * \text{negative polarity pulse} \quad \text{Equation}$$

Here, the amplitude and direct current (DC) level of the negative polarity pulse voltage Va can be level-adjusted according to the resistance values of the resistors R1, R2. The negative polarity pulse voltage Va divided by the resistors R1, R2 is waveform-shaped by the resistor R3 and capacitor C3 in the electromagnetic wave offset section 74. Subsequently, the resistor R4 and capacitor C4 eliminate the spike-like noise of the negative polarity pulse voltage Va, the waveform of which has been shaped by the resistor R3 and capacitor C3. The negative polarity pulse voltage Va is then inputted to the lead wire 75, and the lead wire 75 applies only the voltage component of the inputted negative polarity pulse voltage Va without applying the current component thereof to the front face of the CRT 71. Accordingly, the electromagnetic wave emitted through the front face of the CRT 71 is offset by the negative polarity pulse voltage of the lead wire 75, which has the same amplitude as but the opposite phase to the emitted electromagnetic wave.

The conventional circuit for eliminating the electromagnetic wave in a video appliance shields the emitted electromagnetic wave by coating the surface of the CRT 71 with a conductive material of relative high cost, or by increasing the capacitance of the smoothing capacitor $C_{HV}$ in the flyback transformer 73. However, such way of shielding the electromagnetic wave has caused the increase of the manufacturing cost of the CRT 71. Further, the conventional circuit has failed to completely offset the electric field noise produced in the CRT 71, thereby failing to pass the standard required by the Swedish Confederation of Professionals Employees.

SUMMARY OF THE INVENTION

To resolve the above problems, the object of the present invention is to provide an apparatus of shielding the VLF electric field emitted from the front face of the CRT in a video appliance, which can shield the electric field radiated from the front face of the CRT by detecting the voltage applied to an anode of the CRT from a high-voltage rectifying capacitor of the flyback transformer, synthesizing the detected voltage with the inversion-amplified negative polarity pulse signal, and radiating the synthesized negative polarity pulse signal to the front face of the CRT through an antenna.

Another object of the present invention is to provide an apparatus of shielding the VLF electric field emitted from the front face of the CRT in a video appliance, which can reduce the manufacturing cost of the CRT by constituting the shielding circuit with electronic elements of relative low costs.

In order to achieve the above objects, there is provided an apparatus of shielding a VLF electric field emitted from the front face of a CRT in a video appliance comprising a signal detection section, connected to one end of a flyback transformer, for detecting an anode voltage $V_A$ applied to the an anode of the CRT, an inversion-amplifying section for inversion-amplifying the anode voltage $V_A$ detected by the signal detection section, a waveform-shaping section for waveform-shaping the negative polarity pulse signal induced from an induction coil; a signal synthesizing section for synthesizing the negative polarity pulse signal inputted from the waveform-shaping section with an output signal of the inversion-amplifying section, an output amplifying section for amplifying the synthesized negative polarity pulse signal inputted from the signal synthesizing section and outputting the amplified negative polarity pulse signal, and an antenna, provided on a predetermined portion of the CRT, for radiating the negative polarity pulse signal inputted from the output amplifying section to the front face of the CRT.

BRIEF DESCRIPTION OF THE DRAWINGS

The above objects, other features and advantages of the present invention will be more clearly understood by the following explanation of the preferred embodiment with reference to the accompanying drawings, in which.

DETAILED DESCRIPTION OF THE PREFERRED EMBODIMENT

Figure 1:
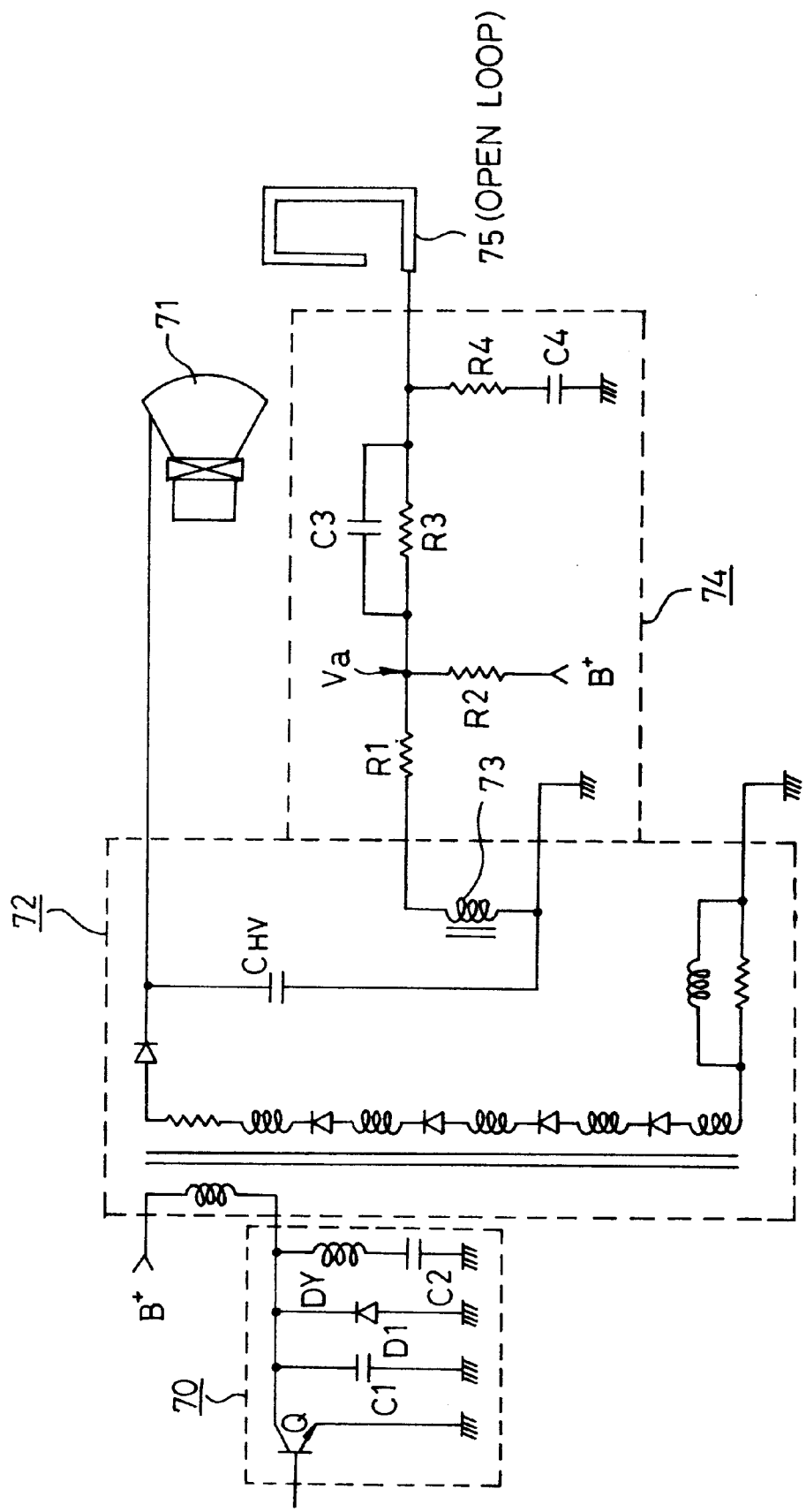
FIG. 1 is a circuit diagram illustrating the conventional circuit for eliminating an electric field noise emitted from the front face of a video appliance.
Figure 2:
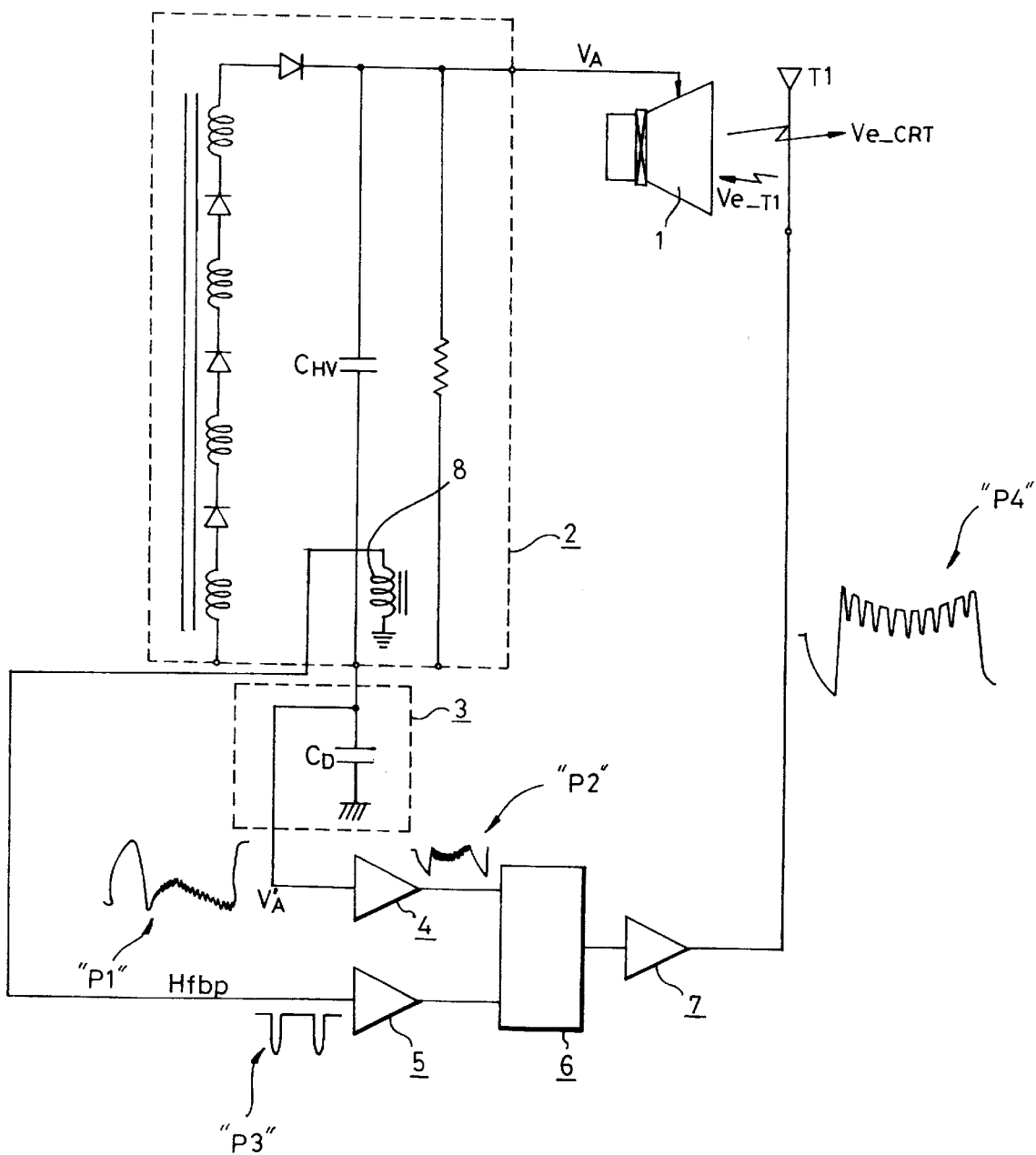
FIG. 2 is a schematic circuit diagram illustrating an apparatus of shielding a VLF electric field emitted from the front face of the CRT in a video appliance according to the present invention.

FIG. 2 is a schematic circuit diagram illustrating an apparatus of shielding a VLF electric field emitted from the front face of the CRT in a video appliance according to the present invention.

Referring to FIG. 2, the VLF electric field shielding apparatus includes a flyback transformer 2 for generating a high voltage according to a horizontal driving pulse signal inputted thereto, supplying the high voltage to an anode of a CRT 1, the flyback transformer 2 having an induction coil (not illustrated) wound at a predetermined number of turns around a core, for inducing a negative polarity pulse signal, a signal detection section 3, connected to one end of a smoothing capacitor $C_{HV}$ connected to one end of the flyback transformer 2, for detecting an anode voltage $V_A$ applied to the anode of the CRT 1, an inversion-amplifying section 4 for inversion-amplifying the anode voltage $V_A$ detected by the signal detection section 3, a waveform-shaping section 5 for shaping the waveform of the negative polarity pulse signal induced from the induction coil, a signal synthesizing section 6 for synthesizing the negative polarity pulse signal inputted from the waveform-shaping section 5 with an output signal of the inversion amplifying section 4, an output amplifying section 7 for amplifying and outputting the synthesized output signal Ve-T1 of the signal synthesizing section 6, and an antenna T1, provided on a predetermined portion of the CRT 1, e.g., at corners of the front or rear face of the CRT 1 in an open-loop state, for radiating the synthesized negative polarity pulse signal Ve-T1 inputted from the output amplifying section 7 to the front face of the CRT 1.

The signal detection section 3 comprises a capacitor $C_D$, connected to one end of the smoothing capacitor $C_{HV}$ connected to one end of the flyback transformer 2, for detecting the anode voltage $V_A$ applied to the anode of the CRT 1.

Figure 3:
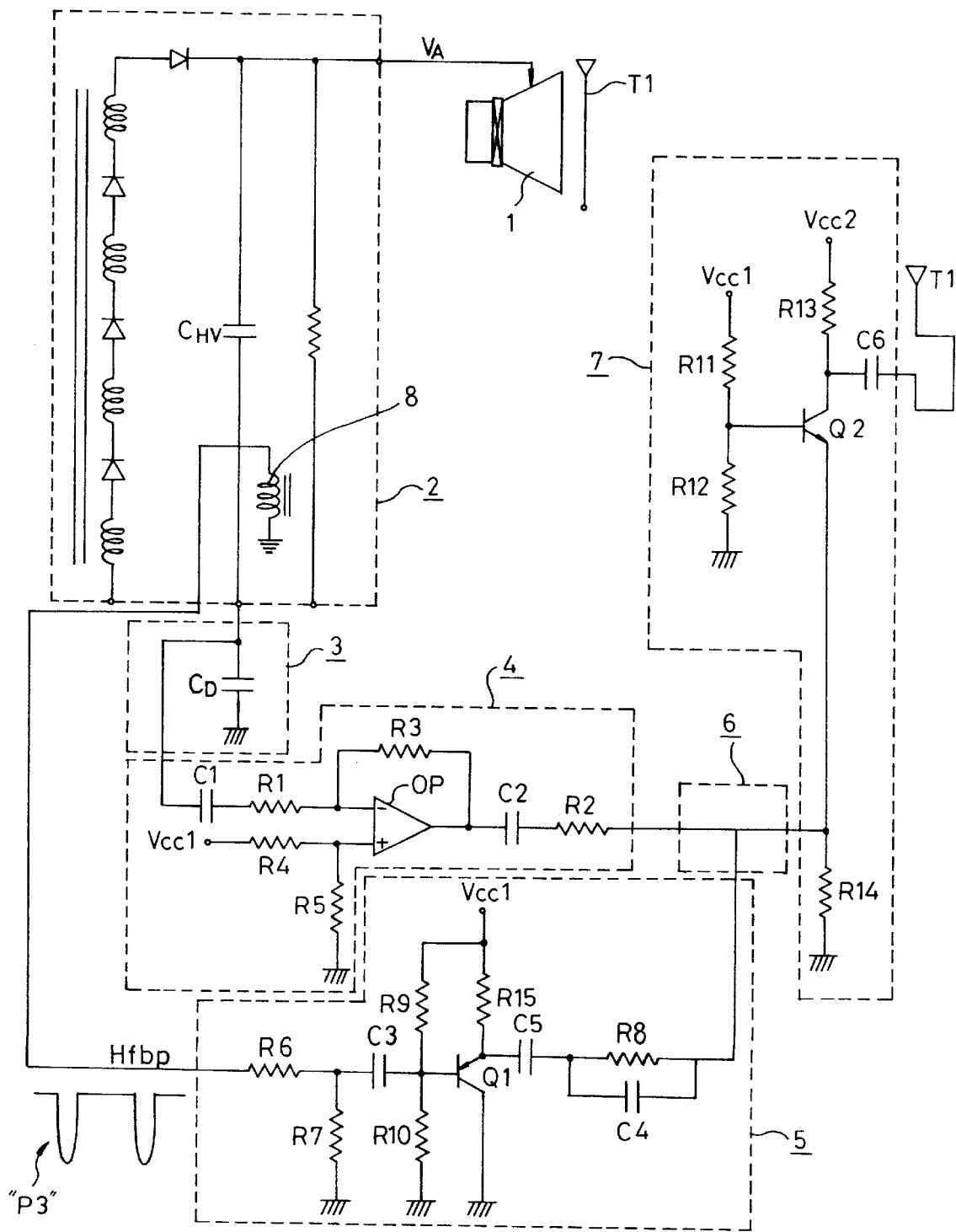
FIG. 3 is a circuit diagram specifically illustrating the circuit of FIG. 2.

Referring to FIG. 3, the inversion-amplifying section 4 comprises a capacitor C1 for smoothing the anode voltage $V_A$ inputted from the capacitor $C_D$, an inversion-amplifier OP for comparing the anode voltage $V_A$ inputted from the capacitor C1 via a resistor R1 with a reference voltage Vref, and inversion-amplifying a resultant voltage of comparison, and a capacitor C2, connected to the output terminal of the inversion-amplifier OP, for smoothing the output signal of the inversion-amplifier OP, and inputting the smoothed signal to the signal synthesizing section 6 via a resistor R2.

A resistor R3 is connected between the inverting terminal and the output terminal of the inversion-amplifier OP. Resistors R4, R5 are connected to the non-inverting terminal of the inversion-amplifier OP to provide the reference voltage Vref.

As illustrated in FIG. 3, the waveform-shaping section 5 comprises resistors R6, R7 for dividing the negative polarity pulse signal induced from the induction coil 8 of the flyback transformer 2, a transistor Q1 for receiving through a capacitor C3 and amplifying the negative polarity pulse signal divided by the resistors R6, R7, and a resistor R8 and a capacitor C4 for waveform-shaping the negative polarity pulse signal amplified by the transistor Q1.

A capacitor C5 is connected between the emitter of the transistor Q1 and the resistor RB. Bias resistors R9, R10 are connected to the base of the transistor Q1.

Referring to FIG. 3, the output amplifying section 7 comprises a transistor Q2 for amplifying the negative polarity pulse signal inputted from the signal synthesizing section 6, resistors R11, R12, connected to a base of the transistor Q2, for dividing a base-bias voltage Vcc1 of the transistor Q2, a resistor R13, connected to a collector of the transistor Q2, for applying a bias voltage Vcc2 to the collector of the transistor Q2. The emitter of the transistor Q2 is connected to the output terminal of the signal synthesizing section 6 and a resistor R14. An antenna T1 is connected to the collector of the transistor Q2 via a capacitor C6.

The antenna T1 may be wound at least once around the corners of the front or rear face of the CRT.

The reference numeral R15 in the drawing denotes a resistor.

The apparatus of shielding the VLF electric field emitted from the front face of the CRT according to the present invention as described above will now be explained with reference to FIGS. 2 and 3.

If power is supplied to the primary winding of the flyback transformer 2 according to the horizontal driving pulse signal, the flyback transformer 2 induces a high voltage and applies the high voltage to the anode of the CRT 1 via the high voltage capacitor $C_{HV}$. The CRT 1 then displays the video signal by the operation of the deflection yoke for deflecting the electron beams.

At this stage, an electric field Ve-CRT is generated from the front face of the CRT 1 due to the high voltage $V_A$. If the capacitance value of the high voltage capacitor $C_{HV}$ is infinite, the high voltage $V_A$ has a constant DC value having no ripple component. Practically, because of the finite capacitance value of the capacitor $C_{HV}$ the high voltage $V_A$ of the flyback transformer 2 applied to the anode of the CRT includes a ripple component in addition to the DC component. Accordingly, an electric field in the range of hundreds of mV is generated from the front face of the CRT 1 by the high voltage including such ripple component.

Meanwhile, the capacitor $C_D$ in the signal detecting section 3 detects a high voltage $V_A'$ induced from the flyback transformer 2, as illustrated as "P1" in FIG. 2, and inputs the detected high voltage $V_A'$ to the capacitor C1 in the inversion-amplifying section 4.

Here, the high voltage $V_A'$ is detected from the high voltage $V_A$ applied to the anode of the CRT at the following ratio.

$$\frac{C_{HV}}{C_{HV} + C_D} * V_A = V_A$$

The high voltage $V_A'$ inputted to the capacitor C1 is applied to the inverting terminal of the inversion-amplifier OP after the noise contained therein is eliminated through the capacitor C1 and the resistor R1. The reference voltage Vref set by the resistors R4, R5 is applied to the non-inverting terminal of the inversion-amplifier OP. Subsequently, the inversion-amplifier OP compares the high voltage $V_A'$ inputted to its inverting terminal with the reference voltage Vref, and inversion-amplifies the resultant voltage of comparison. At this time, the inversion-amplifier OP amplifies the signal having a waveform of the same amplitude as but the opposite phase to the riffle component of Ve-CRT generated from the front face of the CRT 1. Then, the output of the inversion-amplifier is inverted to have a phase of 180°, and is then waveform-shaped through the capacitor C2 and the resistor R2. The waveform-shaped output signal of the inversion-amplifier is then inputted to the signal synthesizing section 6 as illustrated as "P2" in FIG. 2.

At the same time, the negative polarity pulse signal $H_{fbp}$ induced from the induction coil of the flyback transformer 2 is applied to the resistor R6 in the waveform-shaping section 5 as illustrated as "P3" in FIG. 2. The resistors R6, R7 divide the inputted negative polarity pulse signal, and inputs the divided negative polarity pulse signal to the base of the transistor Q1 via the capacitor C3. Then, the transistor Q1 amplifies the inputted negative polarity pulse signal, and outputs the amplified negative polarity pulse signal to the resistor R8 and the capacitor C4 via the capacitor C5. The resistor R8 and the capacitor C4 waveform-shapes the negative polarity pulse signal outputted from the transistor Q1 so that it has a waveform of the same amplitude as but the opposite phase to that of Ve-CRT generated from the front of the CRT 1, and applies the waveform-shaped pulse signal to the signal synthesizing section 6.

The signal synthesizing section 6 synthesizes the inversion-amplified high voltage $V_A'$ inputted from the inversion-amplifying section 4 with the negative polarity pulse signal inputted from the waveform-shaping section 5, and applies the synthesized signal to the emitter of the transistor Q2 in the output amplifying section 7.

The transistor Q2 amplifies the synthesized pulse signal inputted from the signal synthesizing section 6, i.e., the synthesized pulse signal having a waveform of the same amplitude as but the opposite phase to that of the electric field Ve-CRT generated from the front face of the CRT 1, and inputs the amplified output signal to the antenna T1 via the capacitor C6.

Since the bias voltage Vcc1 is steadily applied to the base of the transistor Q2 via the resistors R11, R12, the transistor Q2 always retains the turned-on state.

The antenna T1 radiates the electric field Ve-T1 of the negative polarity to the front face of the CRT 1 according to the synthesized negative polarity pulse signal inputted from the transistor Q2. The radiated electric field Ve-T1 of the negative polarity, which has a waveform of the same amplitude as but the opposite phase to that of the electric field Ve-CRT generated from the front face of the CRT 1 as illustrated as "P4" in FIG. 2, is offset by the electric field Ve-CRT.

In other words, the electric field Ve-CRT generated from the CRT 1 is offset by the electric field Ve-T1 of the negative polarity radiated from the antenna T1, thereby shielding the VLF electric field.

As described above, according to the present invention, the voltage applied from the high-voltage rectifying capacitor of the flyback transformer to the anode of the CRT is detected and synthesized with the inversion-amplified negative polarity pulse signal, and the synthesized negative polarity pulse signal is radiated to the front face of the CRT through an antenna, thereby shielding the electric field generated from the front face of the CRT. Also, the shielding apparatus can be constructed with electronic elements of relative low costs, and thus the manufacturing cost of a CRT can be reduced, while satisfying the TOC standard.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus of shielding a very low frequency electric field emitted from a front face of a cathode ray tube (CRT) in a video appliance for generating a high voltage through a flyback transformer which is supplied to an anode of the CRT, and inducing a negative polarity pulse signal through an induction coil wound around a core of the flyback transformer, the apparatus comprising:

a signal detection section, connected to the flyback transformer, for detecting the voltage applied to the anode of the CRT, the signal detection section comprising a capacitor, connected to one terminal of a smoothing capacitor connected to the flyback transformer, for detecting the voltage applied to the anode of the CRT;

an inversion-amplifying section for inversion-amplifying the voltage detected by the signal detection section;

a waveform-shaping section for waveform-shaping the pulse signal induced from the induction coil;

a signal synthesizing section for synthesizing the negative polarity pulse signal inputted from the waveform-shaping section with an output signal of the inversion-amplifying section;

an output amplifying section for amplifying the synthesized pulse signal inputted from the signal synthesizing section; and an antenna, mounted on a predetermined portion of the CRT, for radiating the synthesized pulse signal inputted from the output amplifying section.

2. The apparatus of claim 1, wherein the inversion-amplifying section comprises:

at least one capacitor for smoothing the anode voltage;

an inversion-amplifier having its inverting input terminal connected to the signal detection section, for comparing the anode voltage inputted from the smoothing capacitor with a reference voltage, and inversion-amplifying the resultant comparison voltage; and at least one capacitor, connected to an output terminal of the inversion-amplifier, for smoothing the output signal of the inversion-amplifier and inputting the smoothed output signal to the signal synthesizing section.

3. The apparatus of claim 1, wherein the waveform-shaping section comprises:

at least one dividing resistor for dividing the pulse signal induced from the induction coil of the flyback transformer;

at least one transistor for receiving and amplifying the pulse signal divided by the dividing resistors; and a resistor and a capacitor for shaping the waveform of the amplified pulse signal.

4. The apparatus of claim 1, wherein the antenna has at least one turn in an open-loop state.

* * * * *